Oct. 15, 1968     C. B. SALZINGER ET AL     3,405,833
BIAXIALLY ORIENTED ALKENYL AROMATIC RESINOUS TAPE HAVING
A PRESSURE SENSITIVE ADHESIVE THEREON
Filed June 10, 1963
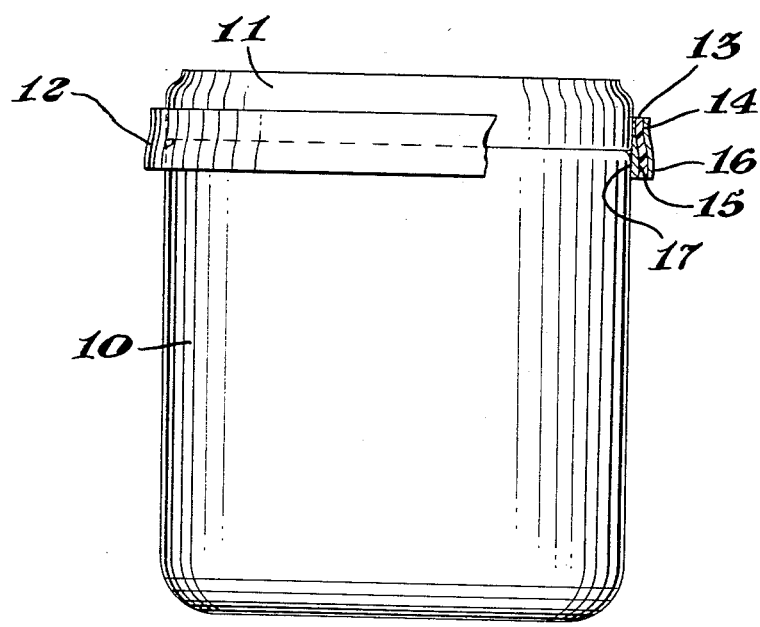
INVENTORS.
Carl B. Salzinger
BY Harold G. Ahlich
AGENT

United States Patent Office 3,405,833
Patented Oct. 15, 1968

3,405,833
BIAXIALLY ORIENTED ALKENYL AROMATIC RESINOUS TAPE HAVING A PRESSURE SENSITIVE ADHESIVE THEREON
Carl B. Salzinger, Mayfield Heights, and Harold G. Ahlich, Fairview Park, Ohio, assignors to The Dow Chemical Company, Midland, Mich., a corporation of Delaware
Filed June 10, 1963, Ser. No. 286,504
5 Claims. (Cl. 215—96)

This invention relates to an improved pressure sensitive tape. It more particularly relates to an oriented alkenyl aromatic resinous pressure sensitive tape.

By alkenyl aromatic resinous is meant a solid thermoplastic polymer of one or more polymerizable alkenyl aromatic compounds. The polymer or copolymer comprises, in chemically combined form, at least 50 percent by weight of at least one alkenyl aromatic compound having the general formula:

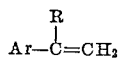

wherein Ar represents an aromatic hydrocarbon radical, or an aromatic halohydrocarbon radical of the benzene series, and R is hydrogen or the methyl radical. Examples of such alkenyl aromatic resins are the solid homopolymers of styrene, $\alpha$-methylstyrene, ortho-methylstyrene, meta-methylstyrene, para-methylstyrene, ar-ethylstyrene, ar-vinylxylene, ar-chlorostyrene, or ar-bromostyrene and the like; the solid copolymers of two or more of such alkenyl aromatic compounds with minor amounts of other readily polymerizable olefinic compounds, methylmethacrylate, or acrylonitrile, etc.

Such thermoplastic alkenyl aromatic resinous materials are readily formed by a variety of methods into oriented sheet material. The sheet material may be oriented in a single direction or alternately biaxially oriented. Biaxial orientation is readily achieved by using a suitable tentering apparatus or by means of bubble extrusion and like means well known to the art. Monoaxial or monodirectional orientation is readily achieved by stretching and permanently deforming the material in a single direction such as by simple drawing at a suitable temperature above its second order transition point. Many applications for pressure sensitive tape require that the material be rigid and maintain its dimensional stability. However, for many applications, known tapes are eminently unsuitable. For example, in the preparation and handling of polystyrene film various pressure sensitive tapes are used. However, in recycling scrap material in the process it is necessary that the rolls of tape be carefully inspected and the splicing tape removed. Otherwise the foreign material in the extrusion would result in a poor product. Removal of such splicing tape is time consuming and expensive. Further there are many applications where it is desired to have a rigid, brittle tape which can be applied and shrunk into close conformity with the supporting body. For example, it would be desirable to apply secondary closures to jars, bottles and the like in the form of a pressure sensitive tape and have them conform smoothly to the contours of the container and the primary closure. Further, many pressure sensitive tapes are not flat and tend to deform readily.

It is an object of this invention to provide an improved heat sensitive tape which can be used as a secondary closure on containers.

It is a further object of this invention to provide an improved pressure sensitive tape which will shrink on heating.

Another object of this invention is to provide a pressure sensitive tape having stable physical dimensions at ambient temperatures.

These benefits and other advantages in accordance with the present invention are achieved by providing a pressure sensitive tape comprising an oriented alkenyl aromatic resinous film having a coating on at least one side of a pressure sensitive adhesive. A wide variety of pressure sensitive adhesives may be utilized for the preparation of tape in accordance with the present invention. Typical compositions are set forth in the following patents: U.S. Patents 3,052,566, 3,032,438, 2,973,286, 2,914,167, 2,878,412 and Canadian Patent 638,072. Generally it is most advantageous to deposit the adhesive on the polystyrene substrate from an aqueous emulsion. However, suitable lacquers may be utilized provided the solvents do not damage the substrates. Selection of suitable solvents is well within the skill of one familiar with the art. Lower alcohols are generally found to be satisfactory. Usually the thickness of the substrate for such pressure sensitive tapes will range between about one-half mil and about 10 mils. However, thicker or thinner tapes are readily prepared depending upon the intended end use therefor.

The figure schematically depicts the use of a pressure sensitive adhesive tape of alkenyl aromatic resinous film in accordance with the invention.

In the figure, there is illustrated a container generally designated by the reference numeral 10. The container 10 has a configuration of a jar having a primary closure 11. The primary closure 11 and a portion of the jar 10 is circumferentially surrounded by a tape 12. The tape 12 is shown in a partially enlarged section. The tape 12 consists essentially of an alkenyl aromatic resinous film 13 having a first side 14 and a second side 15. The first side 14 has disposed thereon a release coat 16 and the second side 15 has disposed thereon and adhered thereto a pressure sensitive layer 17.

By way of further illustration, one inch wide one mil thick oriented polystyrene tapes were coated with suitable adhesives dispersed in an aqueous medium and dried at a temperature of about 180° F. for about 2 minutes. The tapes were wound onto a roll from which they could be unwound with ease. The resultant adhesives coating was about one mil in thickness. Various samples of tape were prepared using the following commercial adhesive compositions: Fuller 1704, Polystix 2036, Union Paste M715, Morningstar Paisley 78–1082.

Conventional release agents may be used. However, particularly effective for coating the surfaces of the tape to which adhesive is not applied is sodium oleate. Also various emulsions of waxes are found effective. One inch tape prepared using the Morningstar Paisley 78–1082 adhesive and having a coating of sodium oleate on the reverse surface of about 100 Angstroms thick was utilized to make butt splices in rolls of polystyrene film. This material was then recycled through the extruder to prepare polystyrene film. The presence of this tape in the extrudate could not be detected and very satisfactory film was obtained.

Another portion of this tape was utilized to prepare secondary closures for jars. The tape was wound around the cover and neck of the jar until it was completely encircled and a portion of the tape overlapped. The taped jar was then exposed to a current of warm air having a temperature of about 350° F. for a length of time sufficient to permit it to shrink into close conformity to the neck of the jar and the primary closures. The jar could not be opened without destroying the secondary closure. Similar secondary closures were evaluated by placing them in a 90 percent relative humidity atmosphere and by immersing them in water. Unlike most secondary closures they showed no effect from the humidity or water, maintained their shape and tight engagement with the jars. Such tapes were found to have a very high gloss and attractive decorative appearance. Tape of the previous example utilized Morningstar Paisley adhesives and was employed as a label protector for extended periods of time and no deterioration due to moisture was observed.

In a manner similar to the foregoing examples other beneficial and advantageous pressure sensitive tapes are prepared utilizing films prepared from other alkenyl aromatic resins such as those containing 70 percent styrene, 30 percent acrylonitrile, polyvinyl toluene, polychlorostyrene, copolymers of 60 percent styrene and 40 percent ethyl acrylate and the like.

As is apparent from the foregoing specification, the manufacture of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A pressure sensitive film consisting essentially of a biaxially oriented alkenyl aromatic resinous film having disposed on at least a portion of one major surface thereof a pressure sensitive adhesive.

2. The film of claim 1 wherein said one surface of the alkenyl aromatic resinous material is coated with a release agent and the opposed surface is coated with the pressure sensitive adhesive.

3. The film of claim 1 wherein the alkenyl aromatic resin is polystyrene.

4. The film of claim 1 wherein the alkenyl aromatic film is polystyrene and the polystyrene is from about ½ to 10 mils in thickness.

5. A heat shrinkable secondary closure comprising the film of claim 1 in circumferential engagement with a container and the primary closure of the container.

References Cited

UNITED STATES PATENTS

| | | | |
|---|---|---|---|
| 2,270,018 | 1/1942 | Davis | 215—38 |
| 2,447,983 | 8/1948 | Little | 215—38 |
| 2,613,156 | 10/1952 | McGaffin et al. | 106—170 |
| 2,622,656 | 12/1952 | Pinksy | 154—2.6 |
| 2,631,954 | 3/1953 | Bright | 117—122 X |
| 2,790,286 | 4/1957 | Snyder | 53—41 |
| 2,914,167 | 11/1959 | Holtz | 117—68 X |
| 3,076,726 | 2/1963 | Ault et al. | 117—155 |
| 3,124,476 | 3/1964 | Park et al. | 117—47 |
| 2,880,862 | 4/1959 | Sermattei | 206—59 |
| 3,235,395 | 2/1966 | Scharf | 117—3.3 |

FOREIGN PATENTS

| | | |
|---|---|---|
| 612,744 | 1/1961 | Canada. |
| 778,234 | 7/1957 | Great Britain. |

WILLIAM D. MARTIN, *Primary Examiner.*

W. D. HERRICK, *Assistant Examiner.*